United States Patent
Berg et al.

(10) Patent No.: US 9,625,345 B2
(45) Date of Patent: *Apr. 18, 2017

(54) SYSTEM FOR CALIBRATION OF A COMPRESSOR UNIT IN A HEATING, VENTILATION, AND AIR CONDITIONING SYSTEM

(71) Applicant: Lennox Industries Inc., Richardson, TX (US)

(72) Inventors: Eric Berg, Carrollton, TX (US); Rakesh Goel, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,467

(22) Filed: Jun. 17, 2016

(65) Prior Publication Data

US 2016/0299029 A1    Oct. 13, 2016

Related U.S. Application Data

(63) Continuation of application No. 14/064,865, filed on Oct. 28, 2013, now Pat. No. 9,417,149.

(51) Int. Cl.
| | |
|---|---|
| F25B 31/00 | (2006.01) |
| G01L 27/00 | (2006.01) |
| F25B 13/00 | (2006.01) |
| F25B 49/02 | (2006.01) |

(52) U.S. Cl.
CPC ............ *G01L 27/005* (2013.01); *F25B 13/00* (2013.01); *F25B 31/00* (2013.01); *F25B 49/022* (2013.01); *G01L 27/002* (2013.01); *F25B 2600/026* (2013.01); *F25B 2600/0253* (2013.01); *F25B 2700/1931* (2013.01); *F25B 2700/2116* (2013.01)

(58) Field of Classification Search
CPC .................................................... G01L 27/005
USPC ........................................................ 73/1.57
See application file for complete search history.

(56) References Cited

U.S. PATENT DOCUMENTS

| | | |
|---|---|---|
| 2007/0119225 A1 | 5/2007 | McFarland et al. |
| 2012/0240659 A1 | 9/2012 | Alfano |
| 2014/0013782 A1 | 1/2014 | Kopko et al. |
| 2015/0219377 A1 | 8/2015 | Goel et al. |

*Primary Examiner* — Clayton E Laballe
*Assistant Examiner* — Dennis Hancock
(74) *Attorney, Agent, or Firm* — Winstead PC

(57) ABSTRACT

The present invention provides for a system for calibrating operation of a compressor unit in a heating, ventilation, and air conditioning (HVAC) system. A measuring device measures an operating parameter of the HVAC system at a position where the measuring device is mounted on a refrigerant line of the HVAC system. The measuring device switches states when the value of the measured operating parameter reaches a switching value. A controller estimates a value of the first operating parameter at the position where the first measuring device is mounted on the refrigerant line, and the controller determines whether the estimated first operating parameter is within a threshold percentage of the switching value.

20 Claims, 4 Drawing Sheets

SYSTEM FOR CALIBRATION OF A COMPRESSOR UNIT IN A HEATING, VENTILATION, AND AIR CONDITIONING SYSTEM

CROSS-REFERENCED APPLICATIONS

This application is a continuation of U.S. patent application Ser. No. 14/064,865, filed on Oct. 28, 2013. This application relates to co-pending U.S. patent application Ser. No. 14/173,686, entitled SYSTEM FOR CONTROLLING OPERATION OF AN HVAC SYSTEM, filed Feb. 5, 2014. U.S. patent application Ser. No. 14/064,865 and U.S. patent application Ser. No. 14/173,686 are incorporated herein by reference.

BACKGROUND OF THE INVENTION

Field of the Invention

The present invention relates to calibration systems used in heating, ventilation, and air conditioning (HVAC) systems and, more particularly, to a system for calibrating operation of a compressor unit in an HVAC system.

The discharge pressure and suction pressure of a compressor in a heating, ventilation, and air conditioning (HVAC) system can be used as a diagnostic tool to troubleshoot problems with the system or to confirm that the system is operating normally. A model of the discharge pressure and suction pressure may be created from test data in a laboratory or manufacturing facility.

Once the HVAC system is installed, however, use of discharge pressure and suction pressure as a diagnostic tool is time consuming and expensive. Trained technicians may manually determine and utilize discharge and suction pressure in diagnostics. A pressure transducer may also be utilized as a tool for determining these pressures. Because of time and costs involved, suction and discharge pressure cannot often be used in the diagnostic process. What is needed are systems and methods for utilizing suction and discharge pressure as diagnostic tools in the calibration of HVAC systems.

SUMMARY

The present invention provides for a system for calibrating operation of a compressor unit in a heating, ventilation, and air conditioning (HVAC) system. A controller estimates the value of an operating parameter of the HVAC system at a position on a refrigerant line of the HVAC system where a measuring device is mounted to measure the operating parameter. The controller determines whether the estimated operating parameter is within a threshold percentage of the value of the operating parameter at which the measuring device switches states.

BRIEF DESCRIPTION OF THE DRAWINGS

For a more complete understanding of the present invention and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning well-known features and elements have been omitted inasmuch as such details are not considered necessary to obtain a complete understanding of the present invention, and are considered to be within the understanding of persons of ordinary skill in the relevant art.

Figure 1:
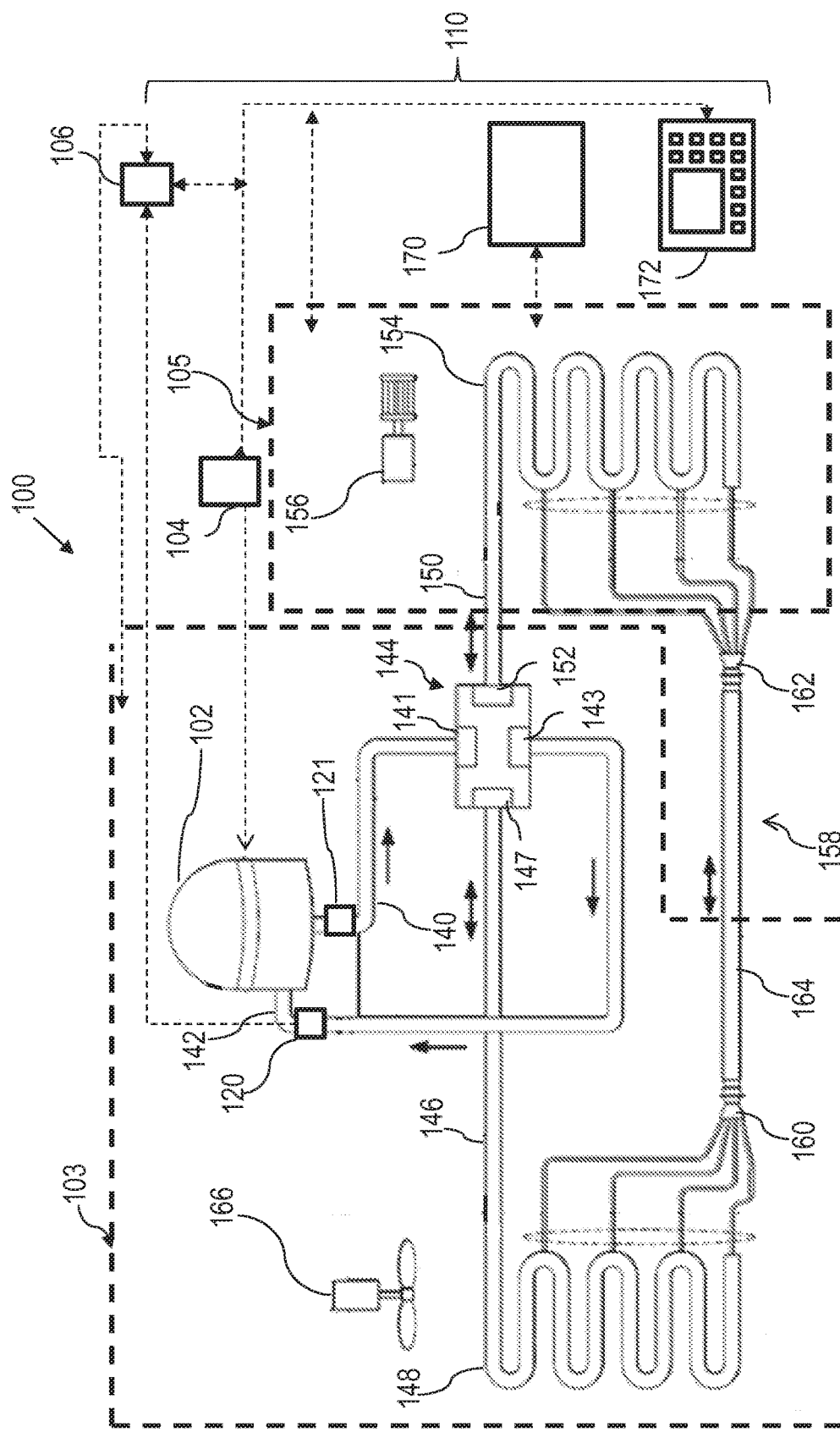
FIG. 1 illustrates an HVAC system.

Referring to FIG. 1, a first compressor unit 102 may be configured to operate in a heat pump, such as a heat pump system 100. The first compressor unit 102 may be configured to compress low pressure refrigerant in vapor form to a higher pressure vapor. It will be understood by persons of ordinary skill that the first compressor unit 102 may operate within the heat pump system 100 in conjunction with other known components.

The heat pump system 100 may comprise an outdoor unit 103 operatively connected to an indoor unit 105. The outdoor unit 103 may comprise the first compressor unit 102 having a suction line 142 and a discharge line 140. The suction line 142 and the discharge line 140 may operatively connect the first compressor unit 102 with a reversing valve 144 at an output port 143 and an input port 141, respectively. The reversing valve 144 may be configured to change the direction of flow of refrigerant within the heat pump system 100.

A first transfer line 146 may operatively connect a first reversing port 147 with an outside heat exchanger unit 148 configured to condense high pressure vapor refrigerant to a liquid. An outdoor fan 166 may be configured to blow outside air over the heat exchange section of the outside heat exchanger unit 148.

A distributor 158 may be operatively connected to the outlet of the outside heat exchanger unit 148 at a first end 160 and operatively connected to the inlet of an outside heater exchanger unit 148 at a second end 162. Liquid tubing 164 may span the first end 160 and the second end 162 for transporting substantially liquid refrigerant from the outside heat exchanger unit 148 to an inside heat exchanger unit 154. The distributor 158 may function as a metering device to regulate the amount of liquid refrigerant flowing into the inside heater exchanger unit 154.

The inside heat exchanger unit 154 may be configured to evaporate liquid refrigerant to a vapor. An indoor blower 156 may be configured to pull air over coils of the inside heat exchanger unit 154 and to circulate air into the enclosed space. A second transfer line 150 may operatively connect a second reversing port 152 with the inside heat exchanger unit 154 to transfer refrigerant in low pressure vapor form back into the compressor unit 102 through the suction line 142.

It will be understood by persons of ordinary skill that operation of the heat pump system 100 may be changed from heating to cooling by reversing flow within the system so that the inside heat exchanger unit 154 operates as a condenser and the outside heat exchanger unit operates as an evaporator.

Figure 2:
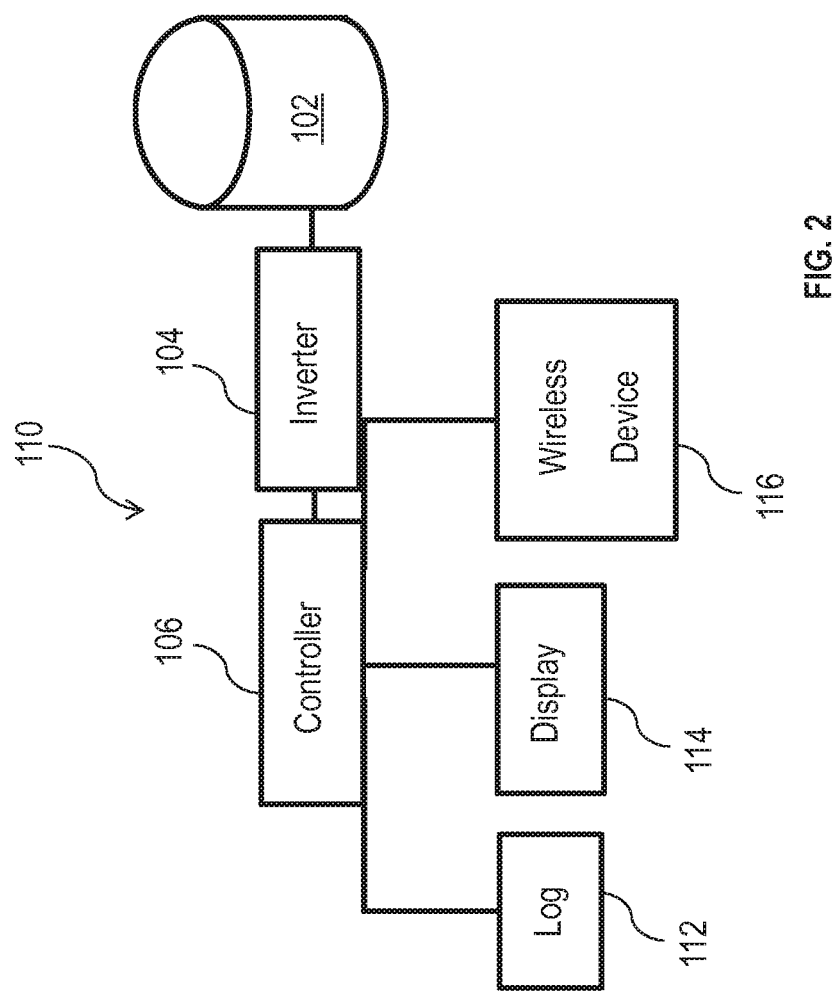
FIG. 2 illustrates a compressor assembly and a control assembly.

Referring to FIG. 2, a control assembly 110 may be operationally coupled to the first compressor unit 102. The control assembly 110 may comprise an electrical power converter, such as a first inverter 104 and an electronic first controller 106. The first inverter 104 may be operationally connected to the first compressor unit 102 and configured to adjust the input voltage delivered to the first compressor unit 102.

The first inverter 104 may be operationally connected to a first controller 106 configured to receive and send operation signals for operation of the HVAC system 100. The first controller 106 may be an outside unit controller.

The first inverter 104 may be operationally coupled to the first compressor unit 102 and configured to modify the input voltage delivered to the first compressor unit 102. The first inverter 104 may be operationally coupled to a first controller 106 configured to receive and send control signals for operation of the HVAC system 100.

A compressor speed of the first compressor unit 102 may be controlled by the first inverter 104 receiving control signals from the first controller 106. It will be understood that the compressor speed may be controlled without the use of an inverter as part of the control assembly 110. In those embodiments, the first controller 106 may be configured to utilize other known variable-speed solutions, including but not limited to pulse width modulation of the compression process, or modulating the capacity by bypassing some of the refrigerant around the compression process (referred to as "unloading").

The control assembly 110 may further comprise other control devices, such as an inside control unit 170 and a thermostat 172. The inside control unit 170 may operate in conjunction with the first controller 106 to control operation of the indoor blower 156 and compressor unit 102. The thermostat 172 may adjust the target temperature and have other commonly-used functions to control the environmental conditions of the enclosed space.

Referring to FIG. 1, the HVAC system 100 may further comprise a measuring device configured to measure an operating parameter of the HVAC system 100. In some embodiments, the measuring device comprises a pressure switch 121 mounted on the discharge line 140 configured to monitor the discharge pressure of the first compressor unit 102. The first controller 106 may be operationally connected to the pressure switch 121 to control the monitoring process and store data.

The pressure switch 121 may comprise an actuation pressure and a reset pressure. The actuation pressure is the discharge pressure at which the switch opens or closes from a normal position, and the reset pressure is the discharge pressure at which the switch returns to a normal position. It will be understood by persons of ordinary skill in the art that the pressure switch 121 may be configured to monitor other pressure values or operating parameters in the HVAC system that may be useful in the systems and methods disclosed in this description, including but not limited to the suction pressure.

Figure 3:
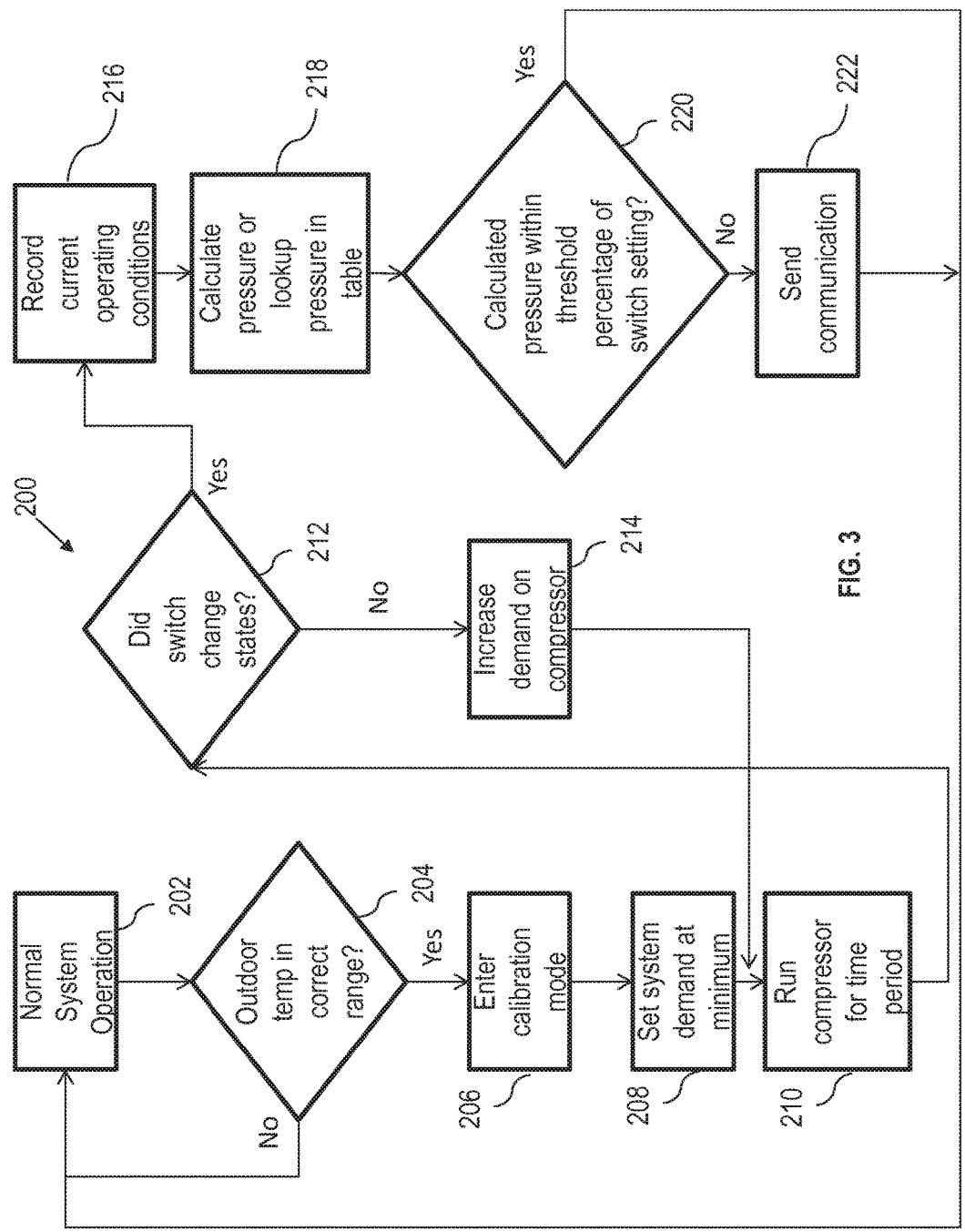
FIG. 3 shows a flow chart of steps in a method for calibrating operation of a compressor unit in an HVAC system.
Figure 4:
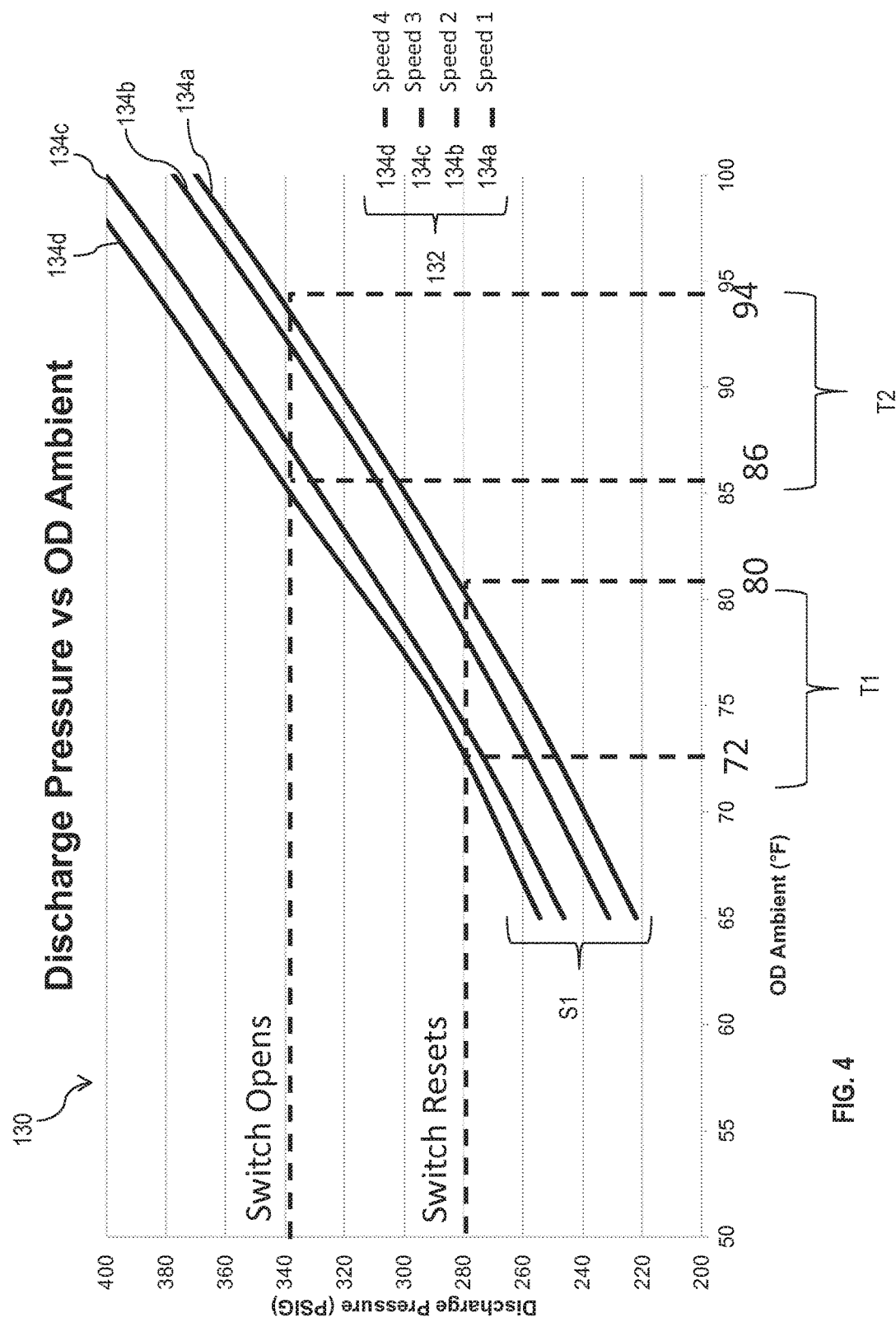
FIG. 4 shows a graph of discharge pressure of a compressor unit versus outside temperature.

Referring to FIGS. 3 and 4, the first controller 106 may be configured to perform one or more methods for calibrating operation of the HVAC system 100. The HVAC system 100 may be configured to operate in a calibration mode. Calibration of the HVAC system 100 may comprise a comparison between a normal operation model 130 of the HVAC system 100 and a measured operating parameter of the HVAC system 100. The model 130 may characterize normal operation as a function of one or more operating conditions. The model 130 shown in FIG. 4 was prepared in laboratory tests using an HVAC system having a variable capacity compressor unit of 5 tons. It will be understood by persons of ordinary skill in the art that a model of normal operation may be prepared for different types of HVAC systems having one or more compressor units of different capacities.

In some embodiments, as shown in FIG. 4, the model 130 may comprise a characterization of the discharge pressure of the HVAC system 100 as a function of the outside ambient temperature in which the compressor unit 102 operates. The model 130 may be compared to a measured value of discharge pressure. The comparison may be used for diagnostic purposes or to determine or infer other useful information about the operation of the HVAC system 100.

Referring to FIG. 4, a normal operation model 130 of discharge pressure as a function of the outside ambient pressure may comprise a data set 132. The data set 132 may comprise one or more pressure curves 134$a$-$d$ which represent the discharge pressures of the HVAC system at a set of outside ambient temperatures expected under normal operating conditions for a specific compressor speed where Speed 4 is the maximum speed of the compressor, Speed 1 is the minimum Speed of the compressor and Speeds 2 and 3 are between Speeds 1 and 4. For example, in some embodiments, Speed 1 corresponding to curve 134$d$ may equal about 22 Hertz (Hz); Speed 2 corresponding to curve 134$c$ may equal about 34 Hz; Speed 3 corresponding to curve 134$b$ may equal about 46 Hz; and Speed 4 corresponding to curve 134$a$ may equal about 58 Hz. It will be understood that range of speed used to characterize the normal operation model 130 may vary according to the configuration and capacity of the compressor used. The data set 132 may be stored in a memory of the first controller 106.

It will be further understood that other measuring devices may be used in place of the pressure switch 121 to obtain measured operating parameters of the HVAC system 100 that would be useful in the calibration processes disclosed in this description. For example, a bimetal temperature switch may be operationally coupled to the HVAC system and configured to measure a condensing temperature of the outdoor coil. A data set for normal operation of the HVAC system 100 may be developed as function of at least the condensing temperature in order to allow for a comparison to be made between normal expected operation and the measured operating parameter.

Referring to FIG. 3, a method for controlling operation of an HVAC system may comprise a first step 202 of verifying normal operation of the system 100. This operation may include verifying that the compressor unit 102 is currently on. In other embodiments, the HVAC system may be in setback or away mode, when demand on the compressor unit 102 is low.

In a second step 204, the controller assembly may verify that the outdoor temperature is in a calibration range. A calibration range may comprise a range of temperatures for a given range of operating speeds of the compressor unit 102 at which the pressure switch 121 changes states. For example, as shown in FIG. 4, the pressure switch 121 may be configured to reset at a discharge pressure of about 280 pounds per square inch gauge (psig) in a first temperature range T1 for a first speed range S1 of the compressor unit 102. The pressure switch 121 may be configured to open at a discharge pressure of about 340 psig in a second temperature range T2 for the speed range S1 of the compressor unit 102.

In a third step 206, the first controller 106 may initiate a calibration mode, based on the verification that the outdoor temperature is in the calibration range. If the temperature is not in the calibration range, then the HVAC system 100 may continue in normal operation (step 202).

In a fourth step 208, the first controller 106 may set the compressor unit 102 to operate at a first operating speed. For example, the compressor unit 102 may be operated at the Speed 4, which may correlate to a maximum demand on the compressor unit 102. It will be understood by persons of ordinary skill in the art that the maximum demand will be compressor-specific and will vary based on the configuration and size of the compressor.

In a fifth step 210, the compressor unit 102 may be operated for a first time period $t_1$. The time period $t_1$ may comprise a pre-determined amount of time configured to increase the discharge pressure of the compressor unit 102 by a pre-selected amount. For example, the time period $t_1$ may comprise about 5 minutes, which may elevate the discharge pressure by about 127%, when the compressor unit 102 is operating at the Speed 2 and at an outside temperature of about 90° F.

The time period $t_1$ may be configured to change the discharge pressure so that the discharge pressure crosses the threshold at which pressure switch 121 changes state. For example, operating the compressor unit 102 at the Speed 2 for 5 minutes may result in the pressure switch 121 actuating.

In step 212, the actuate event of the pressure switch 121 may be recorded in a memory of the first controller 106. If the pressure switch 121 does not change states, the first controller 106 may generate a signal (step 214) to the compressor unit 102 to change demand to operate the compressor unit at a second operating speed. The change in demand may comprise a pre-selected percentage of change from the initial demand load, where the pre-selected percentage is configured to change the discharge pressure of the compressor unit 102. In some embodiments, the discharge pressure is elevated to change the state of the pressure switch 121.

In step 210, the compressor unit 102 may be operated for a second time period $t_2$. The time period $t_2$ may comprise a pre-determined amount of time configured to change the discharge pressure of the compressor unit 102 by a pre-selected amount. It will be understood that the time periods $t_1$ and $t_2$ may be based on the expected operational characteristics of the HVAC system 100, including but not limited to the compressor unit capacity.

In step 216, the current operating state of the HVAC system at the actuate event (recorded in step 212) may be recorded in a memory of the first controller 106. The operating state may comprise known values of the HVAC system 100 and other data readily accessible through measurement by sensors or calculable based on known or measured data within the control assembly 110, including data regarding operation of the compressor unit 102 taken from the inverter 104.

In step 218, the discharge pressure of the compressor unit 102 may be determined based on the operating state. For example, the discharge pressure may be calculated according to the systems and methods described in U.S. application Ser. No. 14/173,686 entitled "SYSTEM FOR CONTROLLING OPERATION OF AN HVAC SYSTEM", which is here incorporated by reference. In other embodiments, a data set containing a characterization of discharge pressure, for example in a table format, may be stored in memory and the predicted discharge pressure may be determined by correlating one or more parameters of the operating state of the compressor unit 102 with the stored estimated value of the predicted discharge pressure. Alternatively, the estimated discharge pressure may be received by the first controller 106 from a separate device, including but not limited to a pressure transducer operationally connected to the HVAC system.

In step 220, the first controller 106 may compare the calculated discharge pressure of step 218 to the value of the pressure at which the pressure switch 121 is configured to change states (referred to as the "switch setting"). The first controller 106 may determine whether the calculated discharge pressure is within a threshold percentage of the switch setting. In some embodiments, the threshold percentage may be in a range of −10% to +10% of the switch setting. The threshold percentage may be pre-selected and programmed into the controller 106 based on the acceptable operational tolerances of the HVAC system 100.

In step 222, the first controller 106 may be configured to generate and send a communication based on whether the calculated discharge pressure is within the pre-selected percentage of the switch setting. For example, if the calculated discharge pressure is outside the threshold percentage of the switch setting, the first controller 106 may send a communication indicating that the HVAC system 100 is not operating within acceptable parameters.

The communication may comprise a textual or visual summary of data regarding operation of the HVAC system 100, including a characterization of discharge pressure of the compressor unit 102, such as a chart, graph, or table. The communication may be sent to a display, stored in memory, or communicated directly to a third party. Referring to FIG. 2, the communication may be stored in a memory log 112 operationally connected to the first controller 106. The predicted pressure may be sent to a display 114. For example, a diagnostician may be connected to a port operationally connected to the controller 106 and may request a reading of the predicted discharge pressure, or may access the memory log 112 that contains a history of the predicted pressure for a given time period. In other embodiments, the communication generated by the first controller 106 in step 222 may be sent via a wireless device, for example as an email or text message.

In other embodiments, the measuring device, such as the pressure switch 121, may be positioned at other positions within the HVAC system 100 for calibrating the pressure at that position, including but not limited to positioning a pressure switch 120 positioned on the suction line 142 for measuring suction pressure, as shown in FIG. 1.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed:

1. A system for calibrating operation of a compressor unit in a heating, ventilation, and air conditioning (HVAC) system, the system comprising:
   an indoor unit operatively connected to an outdoor unit;

wherein the outdoor unit comprises a compressor unit, the compressor unit comprising a suction line and a discharge line;
a control assembly configured to operationally connect to the compressor unit, wherein the compressor unit operates at an outside ambient temperature;
a measuring device mounted on the discharge line of the compressor unit, wherein the measuring device is configured to measure at least a first operating parameter of the HVAC system and switch states from a first state to a second state when the value of the measured first operating parameter reaches a first switching value; and
a controller of the control assembly is configured to estimate a first estimated value of the first operating parameter of the HVAC and determine whether the first estimated value is within a first threshold percentage of the first switching value.

2. The system of claim 1, wherein the discharge line comprises a channel for the flow of refrigerant with the HVAC system.

3. The system of claim 1, wherein the controller is configured to generate a first communication based on the determination of whether the first estimated value is within the first threshold percentage of the first switching value.

4. The system of claim 3, wherein the controller is configured to send the first communication using a wireless connection with an external device.

5. The system of claim 3, wherein the controller is configured to determine whether the first measuring device has switched states from the first state to the second state.

6. The system of claim 5, wherein the controller is configured to change demand on the compressor unit from a first load to a second load if the measuring device has not switched states from the first state to the second state.

7. The system of claim 6, wherein changing the demand on the compressor unit comprises changing a speed of the compressor unit.

8. The system of claim 6, wherein:
the controller is configured to initiate a first mode of operation for calibrating operation of the compressor unit, wherein the initiation of the first mode of operation is based on the outside ambient temperature; and
the controller is configured to operate the compressor unit under the second load for a first time period to change the measured first operating parameter of the HVAC system to cause the measuring device to switch states.

9. The system of claim 8, wherein the controller is configured to determine whether the outside ambient temperature is within a first calibration range and change states when the compressor unit is operated within the first calibration range.

10. The system of claim 9, wherein:
the measuring device comprises a pressure switch and the first operating parameter comprises a pressure of a refrigerant in the discharge line at a position where the measuring device is mounted; and
the pressure switch is configured to measure the pressure of the refrigerant at the position where the pressure switch is mounted on the first line.

11. The system of claim 9, wherein:
the measuring device comprises a temperature switch and the first operating parameter comprises a temperature of a refrigerant in the discharge line at a position where the measuring device is mounted; and
wherein the temperature switch is configured to measure the temperature of the refrigerant at the position where the temperature switch is mounted on the first line.

12. A method for calibrating operation of a compressor unit in a heating, ventilation, and air conditioning (HVAC) system:
providing a control assembly configured to operationally connect to a compressor unit of the HVAC system, wherein the compressor unit is configured to operate at an outside ambient temperature;
mounting a measuring device on a discharge line of the compressor unit, wherein the measuring device is configured to measure at least a first operating parameter of the HVAC system and switch states from a first state to a second state when the value of the measured first operating parameter reaches a first switching value;
switching from the first state to the second state when the value of the measured first operating parameter reaches the first switching value;
estimating, using the controller, a first estimated value of the first operating parameter; and
determining, using the controller, whether the first estimated value is within a first threshold percentage of the first switching value.

13. The method of claim 12, further comprising:
responsive to a determination that the first estimated value is within the first threshold percentage of the first switching value, generating, using the controller, a first communication.

14. The method of claim 13, further comprising sending the first communication to an external device using a wireless connection.

15. The method of claim 14, further comprising determining whether the measuring device has switched states from the first state to the second state.

16. The method of claim 15, further comprising:
responsive to a determination that the measuring device has not switched states from the first state to the second state, changing demand on the compressor unit from a first load to a second load.

17. The method of claim 16, wherein changing the demand on the compressor unit comprises changing a speed of the compressor unit.

18. The method of claim 15, further comprising:
initiating, using the controller, a first mode of operation for calibrating operation of the compressor unit, wherein the initiation of the first mode of operation is based on the outside ambient temperature; and
operating, using the controller, the compressor unit under the second load for a first time period to change the measured first operating parameter at the discharge line from a first measured value to a second measured value, wherein the change in the first operating parameter at the discharge causes the measuring device to switch states.

19. The method of claim 18, further comprising:
measuring, using the controller, the outdoor temperature; and
changing, using the measuring device, states when the compressor unit is operated at the outside ambient temperature within a first calibration range.

20. The method of claim 18, wherein:
the measuring device comprises a pressure switch, and the first operating parameter comprises a pressure of a refrigerant in the discharge line at a position where the measuring device is mounted; and
the pressure switch is configured to measure the pressure of the refrigerant at the position where the pressure switch is mounted on the first line.

* * * * *